United States Patent                                      [11] 3,532,201

[72] Inventor  Kennedy McConnell
              Riverdale, Illinois
[21] Appl. No. 761,687
[22] Filed     Sept. 23, 1968
[45] Patented  Oct. 6, 1970
[73] Assignee  Interlake Steel Corporation
              Chicago, Illinois
              a corporation of New York
              Continuation-in-part of application Ser. No.
              753,605, Aug. 19, 1968, now abandoned

[54] CONVEYOR LOAD SPACER
     6 Claims, 4 Drawing Figs.
[52] U.S. Cl. ............................................. 193/35,
                                   193/40; 221/13, 221/23
[51] Int. Cl. ............................................. B65g 13/00
[50] Field of Search .................................... 193/35,
                                      35(A), 40; 221/13

[56]                References Cited
              UNITED STATES PATENTS
     1,819,032  8/1931  Lehman .................... 193/40(UX)
                  FOREIGN PATENTS
       533,372 11/1956  Canada ..................... 193/35(A)

Primary Examiner—Gerald M. Forlenza
Assistant Examiner—George F. Abraham
Attorney—William P. Porcelli ABSTRACT: A conveyor load spacer having a forward actuator and a rear actuator connected together so that the rear actuator arrests motion of a rear load in spaced relation from a forward load engaged with the forward actuator. A braking device is included to retard movement of another load behind the rear load as the rear actuator is released to allow the rear load to move to the position of the forward actuator. The braking device slows the other load sufficiently to permit the rear load to reach the forward actuator and the rear actuator to be in load-engaging position before arrival of the other load against it.

Patented Oct. 6, 1970 3,532,201
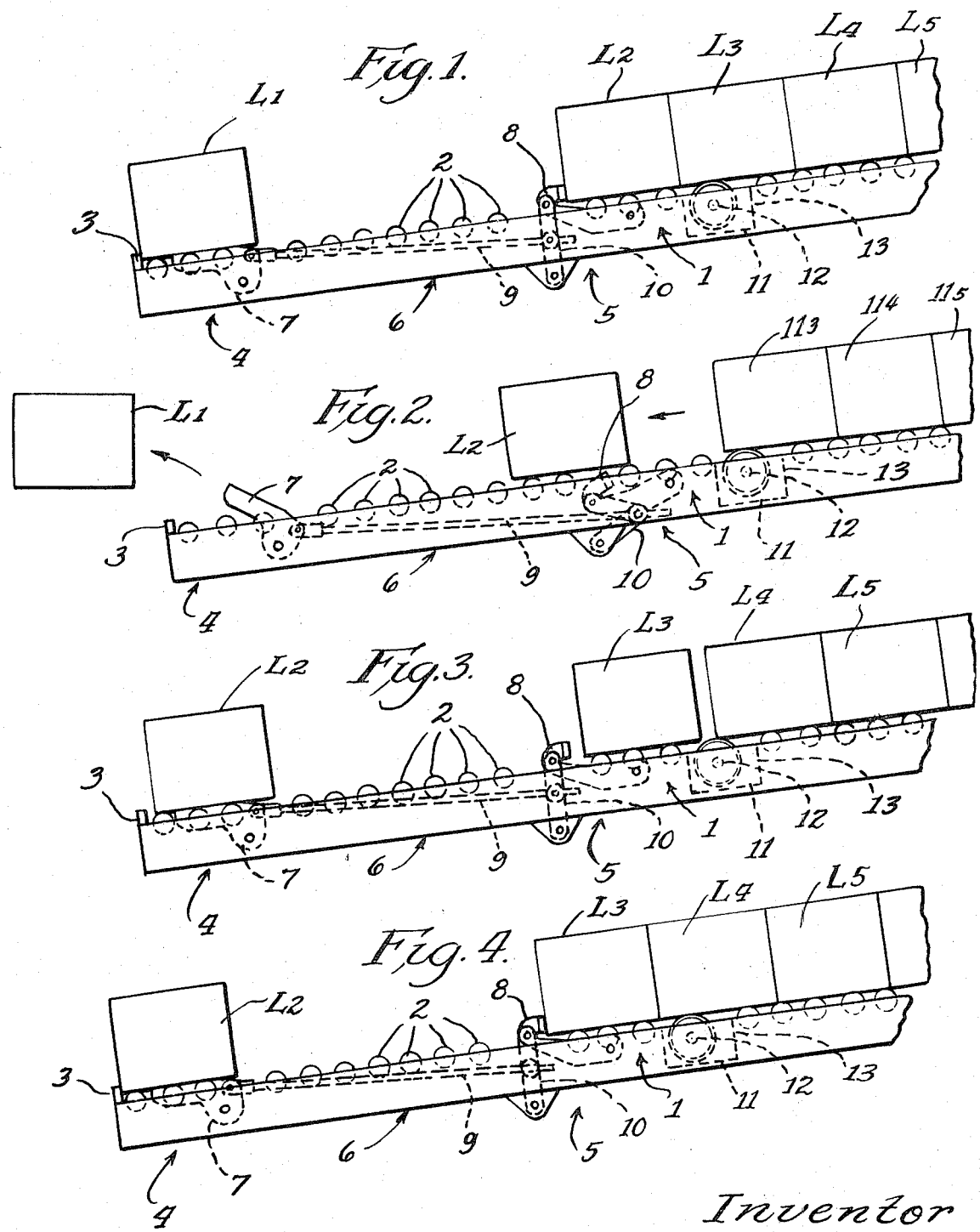
Inventor
Kennedy McConnell
By William P. Porcelli
Atty

CONVEYOR LOAD SPACER

SPECIFICATION

This application is a continuation-in-part of my copending application entitled "Conveyor Load Check," Ser. No. 753,605, filed Aug. 19, 1968, now abandoned.

This invention relates to a load spacing device particularly suited for use on a gravity flow conveyor for automatically controlling the spacing between two sequentially positioned loads delivered along the conveyor and includes a braking device for insuring proper operation of the load spacer mechanism without interference from the loads aligned on the conveyor.

In the ordinary type of inclined flow gravity conveyor loads stored along the conveyor travel down its incline toward a delivery end where they are removed as required. With this type of device, it is desirable to prevent the entire run of loads positioned along the conveyor from bearing against each other and the leading load at the delivery end of the conveyor so that the leading load can be easily withdrawn from the conveyor. This is especially true when the loads are very heavy and cause the leading load to be wedged tightly against the end stop of the conveyor at the leading end of the conveyor.

In my copending application, there is disclosed a load check and spacing device which can accomplish the purpose of properly spacing the leading load at the delivery end of the conveyor from the remaining run of loads behind it. However, when the individual loads of the run of loads behind the leading load are not spaced from each other, when the second load is released for movement to the leading load position after the leading load is removed, instead of only the second load moving forward, the entire run of loads, including the second load and those behind it move together toward the leading load position. Without a gap or space between the second and third loads, the rear actuator of the load spacing device is prevented from elevating to obstruct movement of the load behind the second load. As a result, the spacer mechanism becomes ineffective for its intended purpose. It is the principal object of this invention to provide a braking device properly situated on a conveyor in combination with a conveyor load spacing mechanism which insures individual movement of the second load away from the run of loads behind it and its arrival at the forward load station in time to permit the rear actuator to be properly positioned to timely obstruct movement of the load behind the second load and thereby insure proper operation of the device for feed of loads individually from the rear actuator station to the forward actuator station.

In order to accomplish this object, it is another object of the invention to provide a suitable braking device positioned on the conveyor in the region of the ordinary location of the load immediately behind the second load at the rear actuator. In this manner, when the second load is started in its movement to the first load position, the third load and all those loads behind it are retarded in their forward motion. With sufficient braking force, the necessary delay can be obtained.

Other objects and advantages of the invention should become apparent from the following description upon reference to the following drawings in which:

FIGS. 1 through 4 show diagrammatic side elevations of a conveyor embodying the combination of this invention including both the conveyor load check device and a load braking device.

As indicated in the drawings, a preferred embodiment of the invention consists of a conveyor 1 which is positioned at an incline with respect to the horizontal. This can be in the form of any of a number of conveyors, but, as shown, is one provided with freely rotatable rollers 2 journaled transversely on it which provide rolling contact with the various loads L1, L2, L3, L4, L5, and the like. At the lower end of the conveyor is a fixed stop 3 against which the leading load is arrested in its movement.

The conveyor is provided with a leading load station 4 and a rear load station 5. Intermediate these stations is a free conveyor run portion 6. Mounted at the forward load station is a forward actuator 7 and mounted at the rear load station is a rear actuator 8. The rear actuator 8 is elevated in response to lowering the forward actuator 7 and lowering of the rear actuator 8 is caused by elevation of the forward actuator 7 by a spring return means, not shown. A connecting rod 9 extends between the forward actuator 7 and toggle mechanism 10 connected to the rear actuator 8 to provide the raising and lowering motion mentioned. Load spacing mechanism of this type is fully described and shown in my copending application referred to herein.

In addition to the load spacing mechanism, a braking device 11 is shown journaled on a shaft 12 which is suitably mounted in a casing 13 secured to the sides of the conveyor 1 by suitable fastening means. The braking device 11 is in the form of a rubber rimmed roll in driving connection with means which retards the rotation. Such a braking device is shown and described in copending U.S. application Ser. No. 648,030, filed June 22, 1967, now U.S. Pat. No. 3,473,642. Such a braking device is an example of one form possible in the combination, but can be in other forms disclosed in other patents. The particular form referred to is mentioned by way of example, not for limitation.

In operation a leading load L1 is positioned at the leading load station 4 and against the stop 3 where it holds the forward actuator 7 depressed. With the forward actuator 7 depressed, the rear actuator 8 is elevated to prevent forward movement of the second load L2 and those loads L3, L4, L5 etc., positioned behind it. The braking device located in the normal position of the third load L3 is in contact with the third load L3, but since all of the loads are stationary, there is no movement of any of the conveyor parts or those related to it and all parts are in their positions as shown in FIG. 1.

As indicated in FIG. 2, when the leading load L1 is removed from the conveyor 1, the forward actuator 7 is elevated because of its spring return and the rear actuator 8 lowers in response thereto. This permits gravity feed of the second load L2 toward the leading load station 4. The second load L2 is free to move over the rollers 2 without obstruction or braking action. However, load L3 is in contact with the braking device 11 which resists and thereby retards the forward motion of the load L3 and those loads behind it. Consequently, load L2 moves out ahead of load L3 because it is accelerating faster.

As shown in FIG. 3, the braking action of the braking device 11 on the load L3 is sufficient to slow it down enough that the load L2 contacts and depresses the forward actuator 7 prior to the time that L3 fully reaches the rear load station 5. As the forward actuator 7 is depressed, this causes the rear actuator 8 to be elevated into a path of obstruction for load L3. As indicated in FIG. 4, load L2 finally moves its last increment until it contacts the first stop 3. Similarly, load L3 arrives against the rear actuator 8 where it is arrested. Also, load L4 then comes into a location where it contacts the braking device 11 and all parts of the conveyor are in positions as shown in FIG. 4 which are the same as those as FIG. 1. However, there has been a shifting of the loads so that load L2 assumes the position that load L1 formerly had, and the loads L3, L4 and L5 are likewise advanced one load position forward.

In summary, what has been provided is a load check device on a conveyor in combination with a suitably positioned braking device which guarantees escapement of one load at a time to a forward load position where it can be freely manipulated individually without any resistance because of other loads bearing against it.

Although only a single embodiment of the invention has been shown and described, it should be clearly understood that the invention can be manufactured in many different ways without departing from the true scope of the invention as defined by the appended claims.

I claim:

1. In combination with a conveyor having supporting portions along which loads travel, means for urging loads along the conveyor, a load spacing mechanism comprising, first and second load stations spaced longitudinally from each other in the load travel direction along the conveyor, a retractable stop located at the second load station, an actuator located at the first load station, and connecting means between the retractable stop and the actuator, whereby movement of the actuator between elevated and lowered positions causes movement of the stop between lowered and elevated positions, respectively, said actuator being held in its lowered position by a first load positioned at the first load station while a second load behind it is held arrested at the second load station by means of the elevated retractable stop, a braking means interposed on the conveyor to normally engage the underside of a third load which is abutting the second load at the approach to the second load station, whereby upon forward movement of the second load away from the second load station and toward the first load station as the retractable stop is lowered clear of the second load, the braking means retards the speed of movement of the third load relative to the speed of movement of the second load to allow the second load to separate from abutment with the third load and reach the first load station and cause the actuator to be lowered to in turn elevate the retractable stop in time to arrest the third load as it arrives at the second load station.

2. In combination with a conveyor having supporting portions along which loads travel, means for urging loads along the conveyor, a load spacing escapement mechanism comprising, first and second load stations spaced longitudinally from each other in the load travel direction along the conveyor, an actuator located at the first load station and a retractable stop located at the second load station, connecting means between the actuator and the retractable stop enabling the retractable stop to be elevated and lowered by movement of the actuator, the retractable stop normally elevated to retain a second load positioned at the second load station when a first load holds the actuator depressed at the first load station, a braking means interposed on the conveyor to normally engage the underside of a third load which is abutting the second load at the approach to the second load station, elevation of the actuator caused by removal of the first load from the first load station causing the retractable stop to lower and allow movement of the second load toward the first load station, the braking means retarding the speed of movement of the third load sufficiently to permit the second load to separate from abutment with the third load and reach the first load station in time to depress the actuator and thereby cause the retractable stop to be elevated and arrest movement of the third load as it arrives at the second load station.

3. In combination with a conveyor having supporting portions along which loads travel, means for urging loads along the conveyor, a load escapement mechanism comprising, spacing means for spacing a first load longitudinally from a second load in the load travel direction along the conveyor and actuable by a load positioned at first load position, braking means on the conveyor engageable with a third load located immediately behind the second load and in abutment therewith, means connected to the spacing means for causing release of the second load and allow it to move from its initial position toward the position on the conveyor occupied by the first load after the first load is removed from the conveyor, said braking means retarding the movement of the third load during at least a portion of the time the second load moves toward the position occupied by the first load to allow the second load to separate from abutment with the third load and occupy the position of the first load and actuate the spacing means to arrest movement of the third load when it arrives at the initial second load position.

4. The combination as defined by claim 3 characterized by, said conveyor being sloped downwardly toward the first load position so that the force of gravity is said means for urging the loads along the conveyor.

5. The combination as defined by claim 3 characterized by, said conveyor supporting portions having free travel means over which the loads can freely move, said conveyor being sloped downwardly toward the first load position so that the force of gravity is said means for urging the loads along the conveyor.

6. The combination as defined by claim 3 characterized by, said spacing means being spring biased to interfere with passage of a load to the first load position.